United States Patent [19]
Brown

[11] 3,717,604
[45] Feb. 20, 1973

[54] POLYURETHANE PRODUCTION IN THE PRESENCE OF BORON TRIFLUORIDE

[75] Inventor: Robert Alan Brown, Pompton Plains, N.J.

[73] Assignee: Immont Corporation, New York, N.Y.

[22] Filed: Nov. 23, 1971

[21] Appl. No.: 203,106

Related U.S. Application Data

[63] Continuation-in-part of Ser. No. 33,887, May 1, 1970, abandoned.

[52] U.S. Cl. ...............................................260/32.6 N
[51] Int. Cl. ................................................C08g 51/44

[58] Field of Search....................260/32.6 N, 77.5 AB

[56] References Cited

UNITED STATES PATENTS 3,446,771   5/1969   Matsubayashi..................260/32.6 N

*Primary Examiner*—Morris Liebman
*Assistant Examiner*—P. R. Michl
*Attorney*—Abner Sheffer et al.

[57] ABSTRACT

Making linear polyurethane by reaction in solution in an amide such as DMF containing a Lewic acid such as $BF_3$.

7 Claims, No Drawings

POLYURETHANE PRODUCTION IN THE PRESENCE OF BORON TRIFLUORIDE

This application is a continuation-in-part of my copending application Ser. No. 33,887, filed May 1, 1970, now abandoned.

This invention relates to the production of linear polyurethanes in solution in amides, particularly in N,N-dimethyl formamide ("DMF"). The prior art, such as Japanese patent 43-1880 published Jan. 23, 1968, points out that temperatures of below 40° C and preferably below 30° C should be used when an organic diisocyanate is reacted in DMF. According to that patent the diisocyanate dimerizes or trimerizes at higher temperatures and it is therefore absolutely essential that the operation should be carried out within the above-mentioned temperature range. Very long reaction times are needed at these relatively low temperatures. British patent 1,104,174 published Feb. 21, 1968 teaches that diisocyanates polymerize in DMF stating that: "Exact investigations lead to the conclusion that during polymerization a trimerization primarily takes place with formation of isocyanuric acid rings. During further molecular growth, a system cross-linked in all directions and consisting of isocyanuric acid units linked together is formed which the dialkyl formamide enters into a solution or a molecular bond."

I have found that the foregoing disadvantages may be avoided, and high molecular weight soluble linear polyurethanes may be formed rapidly at elevated temperatures, well above 40° C, by incorporating an aprotic Lewis acid in the DMF. A particularly suitable Lewis acid is boron trifluoride, as such or in the form of a complex thereof (e.g. a boron fluoride etherate or a boron fluoride dimethyl Lewis acids are $BCl_3$ and $AlCl_3$ (which, like $BF_3$, contain an atom that has less than a full octet of electrons) and $SnCl_4$ and $TiCl_4$ (in which the central atom has vacant $d$ orbitals) and $FeCl_3$.

The Lewis acid may be supplied as such or in the form of a complex; the complexing agent is preferably a weak Lewis base, i.e. a base whose $pK_a$ in aqueous solution is less than +1 (see D. D. Perin "Dissociation Constants of Organic Bases in Aqueous Solution," pub. 1965 by Butterworths, London, England, and R. Huisgen & H. Brade, Chem. Ber. vol 90, pp. 1,432–1,436, published 1957). Examples of weak Lewis bases are ethers such as diethyl ether ($pK_a$, −3.6) or tetrahydrofuran; amides, e.g. of secondary amines, such as N,N-dimethylformamide ($pK_a$, −0.01); ketones, such as acetone ($pK_a$ −7.2); nitriles, such as acetonitrile ($pK_a$, −4.3); aromatic hydrocarbons, e.g. alkylated aromatic hydrocarbons such as hexamethylbenzene ($pK_a$, −5). Complexes with amines or phosphines are not preferred.

The amount of the Lewis acid is at least about one mol per mol of any tertiary amines present in the DMF. Preferably it is sufficient to combine with all the amines (primary, secondary and tertiary) present in the DMF as well as with any hydroxyl ion that may be present. DMF commonly contains minute amounts of tertiary amines, e.g. 1, 5, 10, 15 or 20 ppm of trimethylamine and bis(dimethylamino)methane, as well as secondary amines such as dimethylamine as impurities. A considerable excess over this amount may be used, e.g. an excess amounting to about 5 or 10 gram mols of Lewis acid per million grams of DMF. Generally the amount of such excess will be well below about 2, preferably well below 1, gram mol of Lewis acid per million grams of DMF. Despite the presence of an excess of the aprotic Lewis acid, linear polyurethanes of high molecular weight are obtained. While the reason for the efficacy of the addition of a Lewis acid is not known, it is believed that the Lewis acid forms a complex with any amines that may be present. However, in view of the small amount of amines in the DMF, and in view of the competing tendency of DMF (present in very much larger amount) itself to form complexes with Lewis acids such as $BF_3$, the results are quite surprising. It is believed that the excess of Lewis acid does form a complex with the DMF in the reaction mixture.

The reaction is advantageously effected at a temperature above 0° C, preferably above 30° C, and still more preferably above 40° C. It is best to operate at temperatures below 200° C, more preferably at temperatures below the boiling temperature of the DMF or other amide solvent at atmospheric pressure, e.g. below about 160° C such as 50°, 60°, 80° or 100° C.

In a preferred embodiment substantially the entire reaction is carried out in DMF, yielding a highly soluble, high molecular weight product of intrinsic viscosity above 0.6, with good control of the polymerization reaction (including control of such factors as reaction rate, viscosity, molecular weight, linearity of the polymer, solubility, and solids content).

A preferred embodiment of the invention employs a multistage reaction method in which the proportions of the reactants supplied to the earlier stage, i.e. to the reaction of the hydroxyl-terminated linear prepolymer, diisocyanate and diol chain extender, are such that there is a small stoichiometric excess of isocyanate groups (an excess of less than 20 mol percent, e.g. 5 to 15 mol percent) and the reaction is continued, in the solvent, until the isocyanate content approaches a substantially constant level, as shown by analysis of a sample of the reaction mixture, (for instance by treatment with a known excess of a 0.01N solution of n-dibutylamine in tetrahydrofuran, followed by titration with 0.01N aqueous HCl). At this time there are substantially no unreacted hydroxyl groups in the reaction mixture. Then, in the later stage, an amount of diol chain extender sufficient to provide one alcoholic hydroxyl group for each unreacted isocyanate group, as determined by that analysis, is added; the ensuing reaction of the isocyanate and hydroxyl groups is continued at controlled temperature and the viscosity of the mixture is measured during this reaction until a viscosity corresponding to an intrinsic viscosity in the range of about 0.9 or 0.95 to 1.4 (or higher, e.g. 1.6, 1.8 or 2.0) is reached. At this time an end-capping reagent, such as an alcohol (e.g. methanol or butanediol) or other chain-terminating reactant is added to stop the reaction. This procedure provides a highly controllable way of producing a novel product of controlled, stable, very high molecular weight which is not further reactive with water or other isocyanate-reactive compounds under normal conditions and which does not gel on storage (e.g. storage of the solution at room temperature for many months).

The amount of diol chain extender supplied to the later stage is below 20 mol percent (e.g. in the range of about 1 to 15 mol percent) of the amount of chain extender present in the earlier stage, in a preferred form of the invention.

In a particularly preferred form of the invention, the reaction of the diisocyanate and the hydroxyl-containing compounds in DMF is carried out in the presence of a catalyst for the reaction of —NCO and alcoholic —OH which does not promote dimerization or trimerization of —NCO in DMF. Particularly suitable catalysts are stannous salts of carboxylic acids such as stannous octoate and covalently bonded tin compounds such a dibutyltin dilaurate. These are known catalysts for isocyanate-hydroxyl reactions; see "Polyurethanes Chemistry and Technology Part I. Chemistry" by Saunders and Frisch published 1962 by Interscience Publishers page 168 Table XXX items B and C for compounds of this type.

The DMF may be analyzed for its content of impurities by vapor phase chromatography. One such analysis of a DMF showed that it contained 0.34 ppm trimethylamine, 0.18 ppm dimethylamine, 0.61 ppm methanol and 0.75 ppm bis(dimethylamino) methane. The equivalent amount of $BF_3$ diethyl etherate needed for reaction with the tertiary amine content is about 2.91 ppm (about 0.82 ppm for the trimethylamine and about 2.09 ppm for the bis(dimethylamino) methane) and about 0.57 ppm for the dimethylamine, for a total of 3.48 ppm of $BF_3$ diethyl etherate for all amines.

The hydroxyl-terminated prepolymer preferably has a molecular weight below 6,000 and more preferably between 400 or 800 and 2,500; a molecular weight of 1,800-2,200 is particularly preferred. It may be a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about three to six carbon atoms in length. A prepolymer which provides flexible or "soft" segments in the polyurethane molecule is preferred.

The hydroxyl-terminated prepolymer may be a polyether. Typical polyethers which are used to provide the soft segments for elastomeric polyurethanes are usually of aliphatic character. One type has the formula $HO(RO)_nH$ where R is a divalent alkylene radical, such as tetramethylene or ethylene or propylene, and $n$ denotes the degree of polymerization.

The preferred diisocyanate is diphenylmethane -p,p'-diisocyanate, but other diisocyanates may be used as such or in admixture therewith. Examples of other diisocyanates are 2,4- toluene diisocyanate, p,p'-diphenyl diisocyanate, bitolylene diisocyanate, tetramethylene diisocyanate, and 4,4'-dicyclohexylmethane diisocyanate. The most suitable diisocyanates have molecular weights below 500.

The chain extender is preferably a low molecular weight glycol. A particularly preferred chain extender is tetramethylene glycol. Others are ethylene glycol, diethylene glycol, hexamethylene glycol or octamethylene glycol. Both hydroxyl groups of the glycol are preferably primary hydroxyls, and the glycol is preferably unbranched (having no branches such as pendent methyl or ethyl groups).

In the preferred class of polyester polyurethanes made with diphenylmethane-p,p'-diisocyanate, those having nitrogen contents in the range of 4 to 5 percent, most preferably in the neighborhood of 4½ percent, (e.g. 4.4 to 4.6 percent) have been found to be particularly suitable.

A particularly suitable polyurethane is made from a polyester prepolymer of at least 1,500 molecular weight, the proportions of aromatic diisocyanate, polyester and chain extender being such that the high molecular weight polyurethane is insoluble in 10 percent concentration in tetrahydrofuran at room temperature.

A preferred catalyst for use in the reaction is dibutyltin dilaurate. As previously indicated this is a well known catalyst for the isocyanate-hydroxyl reaction. It is acidic in nature and, as shown by Saunders and Frisch (previously cited), gives a high rate of reaction in a solvent-free system at 70° C as indicated by a relatively short gelation time.

The proportion of catalyst present in the reaction mixture may be, for instance, within the range of about 0.001 to 1 percent (preferably about 0.01 to 0.05 percent) based on the total weight of the reactants.

The concentration to the reactants in the DMF is preferably such as to produce a polyurethane concentration in the range of about 15 to 40 or 45 percent, more preferably about 30 to 35 percent. The proportion of hydroxyl-terminated prepolymer is preferably in the range of about 40 to 60 percent, more preferably about 50 percent (e.g. 48 to 52 percent), of the total weight of the polyurethane, and the proportion of the diisocyanate is preferably in the range of about 35 to 45 percent, more preferably about 40 percent (e.g. 38 to 42 percent) of the total weight of the polyurethane. The proportion of diisocyanate added to the initial mixture of prepolymer and such chain extender as may be present initially is preferably sufficient to supply about 1.01 to 1.2 isocyanate groups per hydroxyl group in the initial mixture.

The reaction is preferably carried out without substantial addition or removal of dimethylformamide.

The solutions produced in accordance with this invention are especially useful for the production of shoe upper material whose base is a microporous sheet consisting essentially of elastomeric polyurethane material. Unlike conventional leather substitutes which have ultimate elongations of some 20 to 40 percent, these sheets do not have their extensibility constrained by the presence of a reinforcing fabric (such as a woven or non-woven fibrous fabric) and can be stretched well over 50 percent (e.g. well over 100 percent and usually well over 200 percent). In a preferred form of the invention the solution of the high molecular weight elastomeric polyurethane, produced as described above, is mixed with finely divided pore-forming microscopic particulate material (preferably microscopic sodium chloride particles) the mixture is shaped into sheet form and treated so as to add water to the shaped mixture so as to coagulate the polyurethane (which although soluble in DMF is insoluble in a DMF-water mixture containing some 12 percent water). The coagulated sheet is then treated to remove all the pore-forming particles, e.g. by leaching with hot water, to dissolve out all the salt.

In the preferred embodiment, as indicated previously, the reaction mixture consists essentially of bifunctional reactants and the dimerization and trimerization reactions are controlled so as to avoid cross-linking. Results so far indicate that essentially linear polymers produce a particularly suitable microporous shoe leather substitute and that the preferred essentially linear polymers have their glass transition temperatures (measured, for instance, by differential thermal analysis) below 0° C. e.g. at $-25°$ C. at the same time that they display a relatively high modulus of elasticity (in tensile testing).

A controlled degree of polymer chain branching may be produced, while cross-linking and gelation is avoided, by including in the reaction mixture a quantity of monofunctional reagent (e.g. methanol, dimethylamine, or formic acid) and an equivalent amount of a polyfunctional reagent (e.g. a trifunctional alcohol such as trimethylolpropane, trimethylolethane or glycerol) so that the net functionality of these monofunctional and polyfunctional reagents is 2.00 or less. Thus, when the sole polyfunctional reagent is the trifunctional trimethylolpropane, no more than one mol of that compound is present per mol of monofunctional reagent. The amount of polyfunctional reagent is relatively small and may be expressed in terms of the number of reactive groups in excess of two (hereafter called its "over-two-reactive groups") provided by the polyfunctional reagent. Obviously one molecule of trimethylolpropane has one "over-two-reactive group" and one molecule of pentaerythritol has two "over-two-reactive groups." The amount of polyfunctional reagent is usually such as to provide well below 3 (e.g. in the range of 0.1 to 2) gram equivalents of "over-two-reactive groups" per 100,000 grams of the reactants (and, since substantially the entire quantity of the reactants is converted to polymer, less than 3 gram equivalents of "over-two-reactive groups" per 100,000 grams of polymer). In two typical products the amount of polyfunctional reactant (trimethylolpropane) is (a) about 1 gram mol and (b) about one fifth gram mol per 100,000 grams of reactants; since trimethylolpropane has one "over-two-reactive group" these provide, correspondingly, (a) about 1 and (b) about one fifth gram equivalent of "over-two-reactive group" in excess of two per 100,000 grams of product. (In these two examples the ratio of the molar amount of added monofunctional reactant (methanol, other than that added as a chain terminator at the end of the reaction) to the molar amount of trimethylolpropane is (a) about 1:1 and (b) about 1.05:1). It follows that in case (a), if the average molecular weight of the product is assumed to be 100,000, there will be an average of about 1 branch (supplied by the presence of the trimethylolpropane) per polymer molecule, while in case (b) only about a fifth of the polymer molecules will have such a branch. If the average molecular weight of the polymer is assumed to be 50,000 only about half of the polymer molecules will have such a branch, in case (a). Thus, despite the presence of the polyfunctional component, the materials have substantially no chemical cross links and are believed to derive their properties from hydrogen bonding forces rather than cross linkages. Their stress-strain curves are of the same general shape as those shown in FIG. 1 of the article by Stetz and Smith in Rubber Age, May 1965 pg. 74.

As previously described, a chain extender is added after the isocyanate content has reached a constant level, (which indicates that the mixture contains substantially no unreacted hydroxyl groups). Best results have thus far been obtained by using a dihydric alcohol as the chain extender at this stage. It is within the broader scope of this invention, however, to employ other difunctional chain extenders at this stage, either alone or in admixture (e.g. in 1:1 molar ratio) with the diol. Examples of such materials are diamines, e.g. p,p'-diaminodiphenylmethane and aminoalcohols, e.g. aminoethanol.

The amount of chain terminator which is added after the reaction mixture has attained the desired molecular weight (as indicated, for instance, by the viscosity of the solution) is not narrowly critical. It should of course be at least sufficient to react with all the remaining -NCO groups but an excess (e.g. a 5 percent excess) may be used to make sure that the reaction is terminated effectively.

The following example is given to illustrate this invention more fully. In the Example all pressures are atmospheric unless otherwise indicated. In the application all proportions are by weight unless otherwise indicated.

EXAMPLE

To 2398g of N,N-dimethylformamide ("DMF") in a heated reactor are added: 531.5g Desmophen 2001 polyester (a hydroxyl-terminated polyester of 2,000 molecular weight, having a hydroxyl number of about 55.5 mg KOH per g, made from about 1 mol 1,4-butanediol, 1.13 mol ethylene glycol and 2 mols adipic acid), 127.2g 1.4-butanediol, 0.158g $BF_3$ diethyletherate and 0.221g dibutyl tin dilaurate. To the resulting uniform solution (at 32°C) there is added, with stirring, 448g of diphenyl methane-p-p'-diisocyanate. The temperature, after 50 minutes, rises to 60°C and is maintained thereafter at 60.2° to 60.6°C. The mixture is formamide complex). Other analyzed for its —NCO content (expressed in terms of percent of the amount of NCO originally added), as follows: 74 minutes (after the addition of the diisocyanate), 4.20 percent; 123 minutes, 3.71 percent; 142 minutes, 3.48 percent; 159 minutes, 3.51 percent; 177 minutes, 3.52 percent. At 212 minutes (after the addition of diisocyanate) an amount of 1,4-butanediol 5.67g) to provide one alcoholic hydroxyl for each unreacted isocyanate group is added. The viscosity of the solution increases as the reaction proceeds until, 208 minutes after the last addition of diol, additional butanediol-1,4 is added to a portion of the reaction mixture to stop the reaction; this chain-terminating butanediol is added as a 50/50 mixture with DMF in amount of 0.1 percent (based on the total weight of the portion of the reaction mixture to which it is added). The resulting mixture (a 31.8 percent solution) is discharged and cooled. The final solution viscosity is 2,500 poises; final intrinsic viscosity (I.V.) is 1.095 (both measured the next day, at 25°C.) The reaction is continued with two other portions of the same reaction mixture for longer times (several hours longer before stopping the reaction) with the following results: solution viscosity 6.530 poises, I.V. 1.280; solution viscosity 9,200 poises, I.V. 1.340 (all measured, the next day at 25°C). The solutions have very little discoloration.

Analysis of the DMF before the reaction shows that it contains a total amount of amine equivalent, in basicity, to 5.2 ppm of dimethylamine; a total amount of acid equivalent, in acidity, to 20.8 ppm of formic acid; and 0.03 percent of water. The amount of added $BF_3$ etherate is about 4 mols $BF_3$ per equivalent of amine. The water content of the DMF is in the range typical of commercially available DMF, which conventionally contains above 10 PPM of water, e.g. about 300, 100 or 40 PPM.

The process is carried out under substantially anhydrous conditions. The reactor is predried by flushing dry nitrogen through it at 80° C and is then cooled under nitrogen to room temperature before the ingredients are charged thereto. The ingredients are added under a nitrogen blanket. The DMF is added first (after it has passed through a column of a molecular sieve for removal of traces of water); next the polyester, butanediol and catalyst are added in that order and the mixture is agitated until uniform (e.g. for 15 minutes or more). The diisocyanate is then added while stirring and the reactor is sealed and the agitation is effected for the remainder of the reaction.

A microporous sheet having good strength and good water vapor permeability may be made as follows: 800 g of the above polyurethane solution is mixed into 427 g of micropulverized sodium chloride (average particle size 10 microns, maximum particle size 52 microns) contained in a one quart, two-arm kneader. After being mixed for 65 minutes, the mixture is degassed at 4 mm Hg for about 30 minutes, spread between 3.25 mm shims onto a porous temporary support (e.g. a sintered polyethylene sheet treated with "Duponol ME" surfactant), immersed in 20° C water for 1 hour, then overnight in 57° C water, dried and removed from the temporary support. The microporous product is soluble in DMF and any scrap thereof may be mixed with freshly produced polyurethane and DMF and recycled to the process; thus, the scrap may be used to make more of the solution which is cast onto the temporary support. In such recycling the ratio of recycled polyurethane to fresh polyurethane may be, for example, 2:1, 1:1 or 0.1:1. The water used for coagulating the cast layer picks up DMF from that layer forming DMF-water mixture. The DMF is recovered from this mixture for reuse by distillation.

The intrinsic viscosity is determined in highly dilute solution in analytical grade DMF which has been thoroughly dried by storage under a nitrogen atmosphere over a molecular sieve (Linde 5A). Four measurements at 25° C corresponding to four, approximately equally spaced, concentrations are made.

While the invention has been illustrated specifically with DMF as the solvent, it is within the broader scope of the invention to use other solvents, such as other amides, e.g. dimethyl acetamide or N-methyl pyrrolidone, or other solvent systems containing small amounts of tertiary amines, in place of, or in admixture with, the DMF. The extent of reaction is preferably such as to yield a polymer whose intrinsic viscosity is well above 0.6.

It is understood that the foregoing detailed description is given merely by way of illustration and that variations may be made therein without departing from the spirit of the invention. The "abstract" given above is merely for the convenience of technical searchers and is not to be given any weight with respect to the scope of the invention.

I claim:

1. A process for the production of a solution of elastomeric polyester polyurethane in dimethylformamide which comprising reacting reactants consisting essentially of at least one polyester dihydric alcohol and at least one diisocyanate in solution in dimethylformamide containing water and a tertiary amine, the concentration of said tertiary amine in said dimethylformamide being 1 to 20 ppm, the concentration of water in said dimethylformamide being 10 to 300 ppm, said polyester dihydric alcohol comprising a hydroxyl-terminated polyester having a plurality of carboxylic ester linkages and having a molecular weight of leaSt 400 and below 6,000, the proportions of polyurethane forming reactants in said solution being such that their net functionality is at most 2.00 and their concentration being such as to produce a 15 to 35 percent concentration of said polyurethane in the dimethylformamide solvent, the reaction temperature being above 40° C and below 200° C, wherein the improvement comprises carrying out said reaction in the presence of boron trifluoride, the amount of boron trifluoride being at least one mol per mol of amine in said dimethylformamide and being and up to an excess, over said one mol, of less than one gram mol per million grams of dimethylformamide, and the amount of said boron trifluoride being sufficient to prevent gelation during the process, and continuing said reaction until the intrinsic viscosity (measured in dimethylformamide at 25° C) of the resulting polyurethane is in the range of about 0.9 to 2.0 with the reaction mixture being maintained as a liquid solution throughout said reaction.

2. Process as in claim 1 in which said reaction mixture contains about 0.001 to 1 percent, based on the total weight of polyurethane-forming reactants, of a catalyst for the reaction of isocyanate groups and alcohol hydroxyl groups which catalyst is a stannous salt of a carboxylic acid or a covalently bonded tin compound, the concentration of about 30 to 35 percent polyurethane in said dimethylformamide, the reaction temperature is below about 160° C, the amount of said polyester is about 40 to 60 percent of the total weight of the polyurethane.

3. Process as in claim 2 in which said catalyst is dibutyltin dilaurate.

4. Process as in claim 3 in which the boron trifluoride is added as a boron trifluoride-ether complex.

5. Process as in claim 1 in which the polyester is a polyester of a glycol and a dicarboxylic acid or of a hydroxy-carboxylic acid.

6. Process as in claim 4 in which the polyester has a molecular weight of 400 to 2,500 and is hydroxyl-terminated polycaprolactone or a glycol adipate and the polyurethane forming reaction is terminated by the addition of an alcohol as an end-capping reagent.

7. Process as in claim 1 in which the boron trifluoride is added as a boron trifluoride-ether complex.

* * * * *